Jan. 8, 1963
E. H. STAU ETAL
3,072,009
BLIND RIVET AND MANDREL WITH RIBS FOR NOTCHING
ENGAGEMENT WITH A PULLING TOOL
Filed April 28, 1960
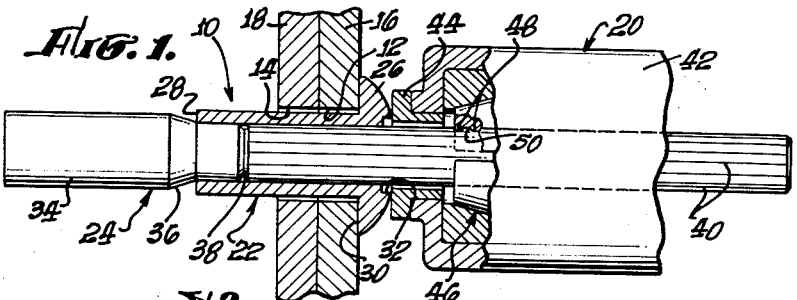
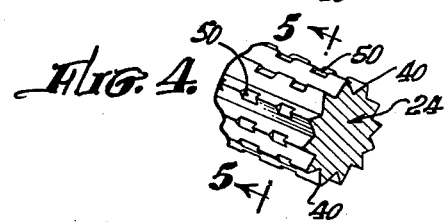
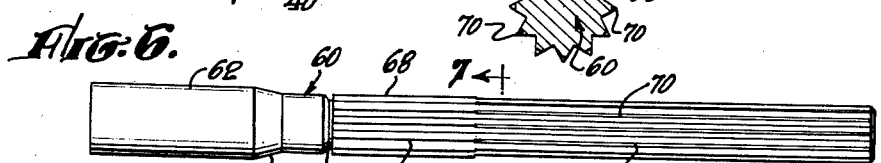
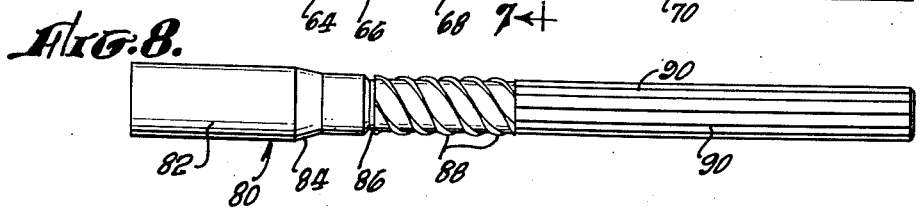
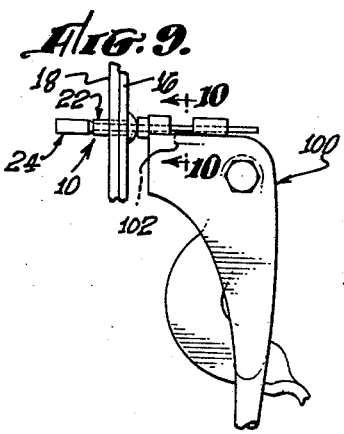
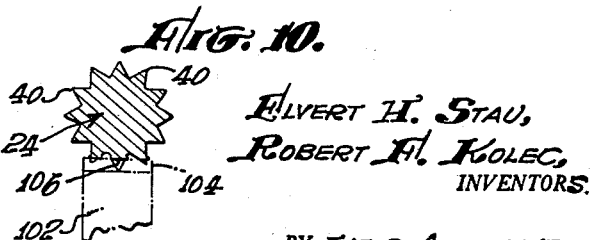
ELVERT H. STAU,
ROBERT A. KOLEC,
INVENTORS.
BY THEIR ATTORNEYS.
HARRIS, KIECH, RUSSELL & KERN.

United States Patent Office 3,072,009
Patented Jan. 8, 1963

3,072,009
BLIND RIVET AND MANDREL WITH RIBS FOR NOTCHING ENGAGEMENT WITH A PULLING TOOL
Elvert H. Stau, Duarte, and Robert F. Kolec, Whittier, Calif., assignors to Olympic Screw & Rivet Corporation, Downey, Calif., a corporation of California
Filed Apr. 28, 1960, Ser. No. 25,308
7 Claims. (Cl. 85—40)

The present invention relates in general to blind rivets and, more particularly, to a blind rivet or rivet assembly adapted to be set by a single long stroke of or a series of two or more short strokes of a reciprocating riveting tool.

In general, a blind rivet assembly of the type to which the invention relates includes a tubular rivet having a head at one end and includes a pin extending through the tubular rivet and having an enlarged end located adjacent the other end or tail of the tubular rivet and adapted to expand such tail when the pin is pulled axially in a direction to engage the enlarged end of the pin with the tail of the tubular rivet. The opposite end of the pin projects from the head of the tubular rivet and is provided thereon with grippable means engageable by the gripping means of a riveting tool for pulling the pin axially of the tubular rivet to set the rivet assembly.

The primary object of the present invention is to provide a blind rivet assembly of the foregoing general character wherein the grippable means on the pin comprises circumferentially spaced, longitudinally extending ribs which are readily notchable by the gripping means of the riveting tool. In other words, the gripping elements of the riveting tool bite into the longitudinally extending ribs on the pin to form complementary notches in the longitudinally extending ribs wherever such notches are necessary to accommodate the gripping elements.

Providing the pin with a grippable means comprising circumferentially spaced, longitudinally extending ribs notchable by the gripping elements of the riveting tool has several importan advantages.

First, the notches in the longitudinally extending ribs are formed exactly where they are needed for the particular stroke or strokes desired, thereby eliminating any necessity for making the stroke or strokes conform to the locations of preformed annular pull grooves.

Second, since the gripping elements of the riveting tool form their own complementary notches in the longitudinally extending ribs, there is no necessity for providing accurate correspondence between the sizes, configurations and spacings of preformed annular pull grooves, for example, and the sizes, configurations and spacings of the gripping elements of the riveting tool. Thus, the present invention may be used with any type of riveting tool having any type of gripping elements, it being unnecessary to provide pins having different grippable means for use with riveting tools having different sizes, shapes and/or spacings of gripping elements. Furthermore, the grippable means of the present invention accommodates riveting tools having worn gripping elements, metal scrapings between the gripping elements thereof, or other defects, without slippage.

Third, any lubricant necessary to facilitate setting of the rivet assembly, is not displaced out of the tubular rivet during assembly of the tubular rivet and the pin by the longitudinally extending ribs constituting the grippable means on the pin. With preformed annular pull grooves, for example, in the pin, the annular ribs between the annular pull grooves displace any lubricant which may be employed out of the tubular rivet during the initial stages of the assembly of the tubular rivet and the pin so that succeeding annular ribs drawn through the tubular rivet are unlubricated, thereby making setting of the rivet assembly difficult, and possibly resulting in damage to the tubular rivet and/or the pin. With the longitudinally extending ribs of the present invention, there is always lubricant available in the tubular rivet to facilitate setting of the rivet assembly, even though there is a rather tight interference fit therebetween, such a fit being necessary to prevent disassembly of the tubular rivet and the pin during handling, shipment, and the like.

An important object of the invention is to provide on the pin longitudinally extending ribs which taper radially outwardly to facilitate notching thereof by the gripping elements of a riveting tool.

Another object of the present invention is to provide a blind rivet assembly wherein a part of the longitudinally ribbed portion of the pin is located within the tubular rivet after assembly of the tubular rivet and the pin, and prior to setting of the rivet assembly, such part of the longitudinally ribbed portion of the pin being pulled past the head of the tubular rivet during setting of the rivet assembly so that it is accessible for engagement by the gripping means of the riveting tool.

A further object of the invention is to provide a pin wherein the longitudinally extending ribs forming the grippable means are straight and parallel to the axis of the pin.

Yet another object is to provide a pin wherein the longitudinally extending ribs of at least a part of the longitudinally ribbed portion are helical.

A further object of the invention is to provide a pin wherein the part of the longitudinally ribbed portion of the pin which is located within the tubular rivet after assembly, and prior to setting, is of larger diameter than the remainder of the longitudinally ribbed portion of the pin, the larger diameter of this part of the longitudinally ribbed portion of the pin serving to insure that the pin and the tubular rivet will remain in the desired assembled relation despite rough handling. Making the remaining part of the longitudinally ribbed portion of the pin of somewhat smaller diameter than the part which is located within the tubular rivet after assembly minimizes scoring of the interior of the tubular rivet during assembly.

An additional object of the invention is to provide the pin with a break neck therein between the enlarged end of the pin nad the longitudinally ribbed portion thereof, the break neck being the weakest portion of the pin and the pin breaking at such break neck upon completion of the setting of the rivet assembly. With this construction, the longitudinally ribbed portion of the pin is broken off and discarded after setting.

The foregoing objects, advantages, features and results of the present invention, together with various other objects, advantages, features and results thereof which will be evident to those skilled in the blind rivet art in the light of this disclosure, may be attained with the exemplary embodiments of the invention described in detail hereinafter and illustrated in the accompanying drawing, in which:

FIG. 1 is a view, partially in longitudinal section and partially in elevation, illustrating a blind rivet assembly which embodies the invention and illustrating a riveting tool for setting such assembly;

FIG. 2 is an enlarged fragmentary perspective view of a longitudinally ribbed portion of a pin of the rivet assembly of the invention;

FIG. 3 is a transverse sectional view taken along the arrowed line 3—3 of FIG. 2;

FIG. 4 is a view similar to FIG. 2, but showing notches formed in the longitudinally extending ribs of the longitudinally ribbed portion of the pin by gripping elements of a riveting tool;

FIG. 5 is a transverse sectional view taken along the arrowed line 5—5 of FIG. 4;

FIG. 6 is an elevational view of another pin embodiment of the invention;

FIG. 7 is an enlarged, transverse sectional view taken along the arrowed line 7—7 of FIG. 6;

FIG. 8 is an elevational view of still another pin embodiment of the invention;

FIG. 9 is an elevational view showing a blind rivet assembly of the invention being set by another type of riveting tool; and FIG. 10 is an enlarged, transverse sectional view taken along the arrowed line 10—10 of FIG. 9.

Referring initially to FIG. 1 of the drawing, the numeral 10 designates a blind rivet assembly of the invention inserted through registering holes 12 and 14 respectively formed in members 16 and 18 to be riveted together upon setting of the rivet assembly by a riveting tool 20. The rivet assembly 10 includes a tubular rivet, designated generally by the numeral 22, and a pin, designated generally by the numeral 24.

The tubular rivet 22 comprises a sleeve having a head 26 on the front or accessible side of the work. The tubular rivet 22 projects through the work and terminates in a tail 28 on the rear or blind side thereof. The head 26 provides a rearwardly-facing annular shoulder 30 adapted to seat against the accessible side of the work and is provided at its front or outer end with an internal annular recess 32 for the reception of material shaved from the pin 24 in a manner to be described.

The pin 24 is provided with an enlarged end or end portion 34 positioned adjacent the tail 28 of the tubular rivet 22 and merging with the body of the pin through a forwardly-convergent annular shoulder 36. The pin 24 is provided forwardly of the tapered annular shoulder 36 with a break neck 38 at which the pin is adapted to snap upon setting of the rivet assembly 10 by the tool 20 in a manner to be described.

The pin 24 is provided forwardly of the break neck 38 with circumferentially spaced, longitudinally extending ribs 40 which extend all the way to the front or outer end of the pin. The sides of each rib 40 converge radially outwardly and include an acute angle therebetween so that the ribs are readily notchable by the riveting tool 20, as will be described.

The riveting tool 20 includes a housing 42 which terminates in a tubular pressure nose 44 seatable against the outer end of the head 26 of the tubular rivet 22. Within the housing 42 is an axially reciprocable gripping means 46 which is adapted to grip the longitudinally ribbed portion of the pin 24 and, by a series of two or more short strokes, to pull the pin axially of the tubular rivet 22 sufficiently to set the rivet assembly 10 and ultimately to snap the pin at the break neck 38. However, it will be understood that the rivet assembly 10 of the invention may be set with a single long stroke as well. When the rivet assembly 10 is set, the enlarged end 34 of the pin 24 is drawn into the tubular rivet 22 to expand it into engagement with the peripheries of the holes 12 and 14 in the work and to enlarge the tail 28 of the tubular rivet sufficiently to seat it against the blind side of the work. Also, as the tapered annular shoulder 36 on the pin 24 engages the pressure nose 44 of the riveting tool 20, material is shaved from the enlarged end 34 of the pin into the annular recess 32 in the head 26 of the tubular rivet to lock in place in the tubular rivet the portion of the pin which remains after snapping thereof at the break neck 38. The foregoing is more or less incidental to the manner in which the pin 24 is gripped by the gripping means 46 in accordance with the present invention, and, accordingly, a further description is not believed to be necessary.

Considering in more detail the coaction between the longitudinal ribs 40 on the pin 24 and the gripping means 46 of the riveting tool 20, the gripping means 46 comprises a chuck having jaws provided thereon with circumferentially extending gripping elements 48. When the gripping means 46 is closed on the longitudinally ribbed portion of the pin 24 prior to each stroke of the series of strokes used to set the rivet assembly 10, or prior to a single long stroke used to set the assembly, the elements 48 of the gripping means bite into the longitudinally extending ribs 40 on the pin 24 to form gripping notches 50 therein, as best shown in FIGS. 1, 4 and 5. The gripping elements 48 bite into the longitudinally extending ribs 40 on the pin 24 sufficiently to withstand the pull forces necessary to set the rivet assembly 10 without slippage of the gripping means 46 axially of the pin.

Thus, gripping elements 48 form their own gripping notches 50 in the longitudinally extending ribs 40 of the pin 24. Consequently, the gripping notches 50 are formed automatically exactly where they are needed for the particular stroke or series of strokes taken by the gripping means 46 and automatically correspond precisely to the sizes, shapes and spacings of the gripping elements 48, which are important features of the invention. Further, since the gripping notches 50 are formed in the longitudinally extending ribs 40 exactly where they are required for the particular sizes, shapes, spacings and conditions of the gripping elements 48, the rivet assembly 10 may be set by riveting tools having a wide variety of gripping-element sizes, shapes, spacings, and the like.

Another advantage of the longitudinally extending ribs 40 on the pin 24 arises from the fact that, upon assembly of the tubular rivet 22 and the pin 24, there is a relatively tight interference fit between the tubular rivet 22 and the part of the longitudinally ribbed portion of the pin which is disposed within the tubular rivet after assembly and prior to setting, this fit being necessary to prevent disassembly of the tubular rivet and the pin during handling, shipment and the like. The longitudinally extending ribs 40 permit this relatively tight fit without axial displacement out of the tubular rivet 22 of any lubricant employed during setting of the rivet assembly 10. Consequently, setting of the rivet assembly 10 is facilitated and scoring or other damage of the tubular rivet 22 and the pin 24 is minimized, which are important features. In the hereinbefore-discussed prior rivet assembly wherein the pin is provided with annular pull grooves, the intervening annular ribs quickly displace any lubricant axially out of the tubular rivet with the result that successive annular ribs have no lubrication as they are drawn through the tubular rivet. This makes setting of the assembly difficult, and may result in damage to the tubular rivet and/or the pin.

Referring to FIGS. 6 and 7 of the drawing, illustrated therein is a pin 60 which is similar to the pin 24 and which includes an enlarged blind end 62, a forwardly convergent, annular shoulder 64 and a break neck 66. Forwardly of the break neck 66 are circumferentially spaced, longitudinal ribs 68 respectively terminating at their forward ends in circumferentially spaced, longitudinal ribs 70 extending to the forward end of the pin 60. The part of the ribbed portion of the pin 60 which is formed by the ribs 68 is slightly larger in diameter than the part of the ribbed portion which is formed by the ribs 70. Actually, the ribs 70 are formed by slightly relieving the apices of parts of the ribs 68. Both the ribs 68 and the ribs 70 are adapted to be notched by the gripping means 46 of the riveting tool 20, or of any other suitable riveting tool.

The advantage of the construction of FIGS. 6 and 7 is that the ribs 70 will readily slide through the tubular rivet 22 upon assembly of such rivet and the pin 60, there being a relatively tight interference fit only between the ribs 68 and the tubular rivet. This facilitates assembly and minimizes scoring, or other damage, to the tubular rivet 22 and/or the pin 60.

Referring to FIG. 8 of the drawing, illustrated therein is a pin 80 similar to the pins 24 and 60 and including an enlarged blind end 82, a forwardly-convergent annular shoulder 84 and a break neck 86. Forwardly of the break neck are longitudinally extending, circumferentially spaced helical ribs 88, and forwardly of these ribs are straight, circumferentially spaced, longitudinally extending ribs 90. The part of the ribbed portion of the pin 80 which is formed by the helical ribs 88 is of a slightly larger diameter than the part of the ribbed portion which is formed by the straight ribs 90. This construction has the same advantages as the pin 60 in that assembly of the pin 80 with the tubular rivet 24 is facilitated with a minimum possibility of damage to the tubular rivet and/or the pin. Also, the slightly enlarged helical ribs 88 tend to resist disassembly of the pin 80 and the tubular rivet 22 to a somewhat greater extent than do the ribs 68.

Referring to FIGS. 9 and 10, the rivet assembly 10 is illustrated therein as being set by a riveting tool 100 which differs from the riveting tool 20 in that it has only a single gripping member 102 engageable with only one side of the longitudinally ribbed portion of the pin 24 and having transverse teeth 104 adapted to bite into the ribs 40 to form gripping notches 106 therein. The main purpose of FIGS. 9 and 10 is to illustrate that the blind rivet assembly 10 of the invention can be set with a riveting tool 100 quite different from the riveting tool 20 previously described.

Although exemplary embodiments of the invention have been disclosed herein for purposes of illustration, it will be understood that various changes, modifications and substitutions may be incorporated in such embodiments without departing from the spirit of the invention as defined by the claims which follow.

We claim:

1. In a blind rivet assembly, the combination of: a tubular rivet having a head at one end; a pin extending through said tubular rivet and having an enlarged end located adjacent the other end of said tubular rivet prior to setting of said rivet assembly and adapted to expand said other end of said tubular rivet when said pin is pulled axially in a direction to engage said enlarged end of said pin with said other end of said tubular rivet, the other end of said pin projecting from said head of said tubular rivet and being provided thereon with a plurality of longitudinally extending, circumferentially separated, circumferentially thin ribs, said ribs being uniformly spaced apart around the entire circumference of the pin and having cross sectional areas of the order of the cross sectional areas of the spaces therebetween, whereby said ribs are readily radially notchable by a gripping means of a riveting tool radially applied thereto to prevent axial slippage of such gripping means relative to said pin.

2. In a blind rivet assembly, the combination of: a tubular rivet having a head at one end; a pin extending through said tubular rivet and having an enlarged end located adjacent the other end of said tubular rivet prior to setting of said rivet assembly and adapted to expand said other end of said tubular rivet when said pin is pulled axially in a direction to engage said enlarged end of said pin with said other end of said tubular rivet, the other end of said pin projecting from said head of said tubular rivet and being provided thereon with a plurality of longitudinally extending, circumferentially separated, circumferentially thin ribs, said ribs being uniformly spaced apart around the entire circumference of said pin and having cross sectional areas of the order of the cross sectional areas of the spaces therebetween, and said ribs tapering radially outwardly and being at least generally triangular in cross section, whereby said ribs are readily radially notchable by a gripping means of a riveting tool radially applied thereto to prevent axial slippage of such gripping means relative to said pin, part of the longitudinally ribbed portion of said pin being located within said tubular rivet prior to setting of said rivet assembly.

3. In a blind rivet assembly, the combination of: a tubular rivet having a head at one end; a pin extending through said tubular rivet and having an enlarged end located adjacent the other end of said tubular rivet prior to setting of said rivet assembly and adapted to expand said other end of said tubular rivet when said pin is pulled axially in a direction to engage said enlarged end of said pin with said other end of said tubular rivet, the other end of said pin projecting from said head of said tubular rivet and being provided thereon with a plurality of longitudinally extending, circumferentially separated, circumferentially thin ribs, said ribs being uniformly spaced apart around the entire circumference of said pin and having cross sectional areas of the order of the cross sectional areas of the spaces therebetween, and said ribs tapering radially outwardly and being at least generally triangular in cross section, whereby said ribs are readily radially notchable by a gripping means of a riveting tool radially applied thereto to prevent axial slippage of such gripping means relative to said pin, part of the longitudinally ribbed portion of said pin being located within said tubular rivet prior to setting of said rivet assembly, said pin having a break neck therein between said enlarged end thereof and said longitudinally ribbed portion thereof.

4. A blind rivet assembly according to claim 3 wherein said longitudinal ribs are straight and parallel to the axis of said pin.

5. A blind rivet assembly according to claim 3 wherein said part of said longitudinally ribbed portion of said pin which is located within said tubular rivet prior to setting of said rivet assembly is of a larger diameter than the remainder of said longitudinally ribbed portion of said pin.

6. A blind rivet assembly as defined in claim 5 wherein the longitudinal ribs of said larger-diameter part of said longitudinally ribbed portion of said pin are straight and parallel to the axis of said pin.

7. A blind rivet assembly as defined in claim 5 wherein the longitudinal ribs of said larger-diameter part of said longitudinally ribbed portion of said pin are helical.

References Cited in the file of this patent

UNITED STATES PATENTS

| | | |
|---|---|---|
| 2,384,321 | Lees | Sept. 4, 1945 |
| 2,438,201 | Buchet | Mar. 23, 1948 |
| 2,542,144 | Kearns | Feb. 10, 1951 |
| 2,574,134 | Vigren et al. | Nov. 6, 1951 |
| 2,803,984 | Swenson | Aug. 27, 1957 |